US009146602B2

(12) United States Patent  
Thabet et al.

(10) Patent No.: US 9,146,602 B2  
(45) Date of Patent: Sep. 29, 2015

(54) METHOD FOR MANAGING ENERGY CONSUMPTION FOR MULTIPROCESSOR SYSTEMS USING AN OFFLINE PHASE FOR CHARACTERIZATION OF A VARIATION OF A POTENTIAL RATE OF PARALLELISM FOR TASK SCHEDULING AND AN ONLINE PHASE FOR DETECTION AND EXPLOITATION OF POTENTIAL INACTIVITY INTERVALS

(75) Inventors: Farhat Thabet, Gif sur Yvette (FR); Karim Ben Chehida, Suresnes (FR); Frédérique Blanc, Bures sur Yvette (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 63 days.

(21) Appl. No.: 12/988,002

(22) PCT Filed: Apr. 15, 2009

(86) PCT No.: PCT/EP2009/054442  
§ 371 (c)(1),  
(2), (4) Date: Mar. 8, 2011

(87) PCT Pub. No.: WO2009/127646  
PCT Pub. Date: Oct. 22, 2009

(65) Prior Publication Data  
US 2011/0271127 A1    Nov. 3, 2011

(30) Foreign Application Priority Data

Apr. 18, 2008 (FR) ...................................... 08 02171

(51) Int. Cl.  
*G06F 1/32* (2006.01)  
*G06F 1/00* (2006.01)

(52) U.S. Cl.  
CPC .................................... *G06F 1/3203* (2013.01)

(58) Field of Classification Search  
CPC ..................................... G06F 1/32; G06F 1/26  
USPC .................................................... 713/320, 300  
See application file for complete search history.

(56) References Cited

U.S. PATENT DOCUMENTS 6,112,023 A * 8/2000 Dave et al. ...................... 703/27  
6,307,281 B1 10/2001 Houston  
(Continued)

FOREIGN PATENT DOCUMENTS

EP         1117031       7/2001  
WO       03090055      10/2003  
WO     2004034251       4/2004

OTHER PUBLICATIONS

Jejurikar, Ravindra and Gupta, Rajesh; Dynamic Slack Reclamation with Procrastination Scheduling in Real-Time Embedded Systems; Jun. 13-17, 2005.*

(Continued)

*Primary Examiner* — Thomas Lee  
*Assistant Examiner* — Robert Cassity  
(74) *Attorney, Agent, or Firm* — Baker & Hostetler LLP (57) ABSTRACT

The invention relates to a method for the on-line management of energy consumption for multiprocessor systems, the method executing at least one application according to a chart of tasks, wherein the method includes, for each application: a first phase for the off-line characterization of the variation of the potential rate of parallelism of execution of the tasks as a function of time, this characterization being based on the worst-case task execution times; and a second phase for the on-line detection and exploitation of the inactivity intervals and of the potential time excesses. A DPM technique makes it possible to determine the duration of the inactivity interval during which a processor may remain inactive according to the potential rate of parallelism characterized in the worst case.

10 Claims, 5 Drawing Sheets

(56) References Cited

U.S. PATENT DOCUMENTS

| | | | |
|---|---|---|---|
| 7,165,252 B1* | 1/2007 | Xu | 718/102 |
| 2006/0218558 A1* | 9/2006 | Torii et al. | 718/107 |
| 2007/0011476 A1* | 1/2007 | Flautner et al. | 713/300 |
| 2008/0028415 A1* | 1/2008 | Binns et al. | 718/107 |
| 2009/0222654 A1* | 9/2009 | Hum et al. | 713/100 |
| 2011/0239017 A1* | 9/2011 | Zomaya et al. | 713/320 |

OTHER PUBLICATIONS

Zhu, et al. "Scheduling with Dynamic Voltage/Speed Adjustment Using Slack Reclamation in Multi-Processor Real-Time Systems", IEEE Transactions on Parallel and Distributed Systems, vol. 14, No. 7, Jul. 2003, retreived from the internet at: <http://ieeexplore.ieee.org/stamp/stamp.jsp?tp=&arnumber=1214320>.*

A.Iranli et al., "System-Level Power Management—An Overview", University of Southern California, Dept. of Electrical Engineering, pp. 1-22, Los Angeles, CA (Dec. 2007).

D. Zhu et al., "Scheduling with Dynamic Voltage/Speed Adjustment Using Slack Reclamation in Multiprocessor Real-Time Systems", IEEE Transactions on Parallel and Distributed Systems, Jul. 2003, pp. 686-700, vol. 14, No. 7.

S. Irani et al., "Online Strategies for Dynamic Power Management in Systems with Multiple Power-Saving States", ACM Transactions on Embedded Computing Systems, Aug. 2003, pp. 325-346, vol. 2, No. 3.

N. Ventroux, "Contrôle en ligne des systèmes multiprocesseurs hétérogènes embarqués—élaboration et validation d'une architecture", doctoral thesis defended on Sep. 19, 2006 at University of Rennes 1, summary in English "Online Control of Onboard Heterogeneous Multiprocessor System—Development and Validation of an Architecture".

* cited by examiner

METHOD FOR MANAGING ENERGY CONSUMPTION FOR MULTIPROCESSOR SYSTEMS USING AN OFFLINE PHASE FOR CHARACTERIZATION OF A VARIATION OF A POTENTIAL RATE OF PARALLELISM FOR TASK SCHEDULING AND AN ONLINE PHASE FOR DETECTION AND EXPLOITATION OF POTENTIAL INACTIVITY INTERVALS

CROSS-REFERENCE TO RELATED APPLICATIONS

This application is a National Stage of International patent application PCT/EP2009/054442, filed on Apr. 15, 2009, which claims priority to foreign French patent application No. FR 08 02171, filed on Apr. 18, 2008, the disclosures of which are incorporated by reference in their entirety.

FIELD OF THE INVENTION

The present invention relates to a method for managing energy consumption for multiprocessor systems. It applies notably to the energy requirements of the new generations of embedded multiprocessor systems in which the battery life constraint is becoming increasingly critical. Thus, it applies in particular to embedded systems, for example for multimedia or telecommunication applications.

BACKGROUND OF THE INVENTION

Multiprocessor systems incorporate increasingly complex and diversified applications which demand increasing computation and storage performance levels. Such increasing performance levels, which are reflected on the one hand by always increasing operating frequencies and on the other hand by an increase in the number of processors and memory circuits, result in an increasingly high energy consumption.

The parallel processing of an application by a set of computation elements, typically processors, requires this application to be subdivided into a number of processing blocks called tasks. These tasks are executed in succession and in parallel. The aim of this subdivision is notably to execute individual computation tasks in parallel and thus speed up the computation, the parallel tasks being assigned to a number of processors. The architectures that exploit this type of parallelism, called multiprocessor architectures, offer great operating flexibility and good performance in terms of computation power. In practice, they are capable of executing a number of applications in parallel, as well as applications that have a strong parallelism at task level. These multiprocessor architectures that make it possible to execute parallel applications that have increasing storage and computation capabilities consume a great deal of energy requiring suitable management of this consumption.

In a real-time context, these architectures are often dimensioned for the worst case according to the applications supported and the time constraints to be observed. The dimensioning phase consists in characterizing each task by a worst-case execution time WCET. Once the WCETs of the various tasks have been calculated, a number of processors making it possible to exploit the parallelism and guarantee that the time constraints are observed is set in the worst case. This number of processors is strongly dependent on the choice of scheduling implemented to set the execution priorities of the tasks while observing the dependencies between the tasks. Inactivity intervals of certain processors may occur at certain task synchronization points, these inactivity intervals being due to the variation of the potential rate of parallelism of the application and may be characterized according to the worst-case execution behavior. If these inactivity intervals occur during actual execution in the same way, idle modes may be determined off-line and implemented during execution, on-line, to reduce the energy consumed. Unfortunately, the variation of the actual execution times AET of the tasks relative to the worst-case execution times WCET alters the order and the times of activation of the tasks. Thus, the off-line prediction of these inactivity intervals becomes difficult. This difficulty limits the exploitation of these opportunities for reducing the energy consumed which occur during execution. The differences between the worst-case behaviors and the actual behaviors become increasingly significant in the applications that are data dependent and that have a lot of control. These differences do, however, offer a great potential for optimizing the consumption. In practice, the variation of the task execution times compared to the worst-case execution times reveals time excesses. These time excesses may be exploited to slow down the execution speeds of the subsequent tasks and therefore locally reduce the consumption while observing the real-time constraints. In a global scheduling context, the difficulty occurs at the level of the distribution of the time excesses, which are obtained during execution, in order to effectively reduce the energy without violating the time constraints.

Solutions dealing with the consumption management problem at resource level are known. These solutions aim to reduce the energy consumed by the computation resources (processors) in an embedded system by being based on so-called DPM (dynamic power management) and/or DVFS (dynamic voltage and frequency scaling) techniques. The DPM techniques consist in exploiting the inactivity intervals by switching to idle modes the resources that are not used for a given time period. The DVFS techniques aim rather to exploit the time excesses and locally or globally lower the frequency and the voltage of certain resources. A first non-optimal variant combines all the methods that implement only the DPM techniques by being based on the off-line prediction of the inactivity intervals of the resources, as is notably described in document D1 by A. Iranli at et al: "System-level Power Management—An Overview", University of Southern California, Dept of Electrical Engineering, Los Angeles. However, the variation of the actual task execution times relative to the worst-case execution times WCET varies on-line the order and the times of activation of the tasks. Thus, the off-line prediction of these arrival times and of the lengths of these inactivity intervals becomes very difficult. The implementation of the DPM techniques which are based on prediction may culminate in certain cases, where the execution profile of the application is more or less deterministic, in interesting results. In a general context in which a number of applications with a number of instances whose arrival times are not known, the implementation of these techniques remains very tricky. In practice, with a poor prediction, these techniques may introduce additional latencies that are likely to violate the time constraints.

A second variant combines all the methods that implement only the DVFS techniques. This variant is notably described in a document D2 by D. Zhu et al: "Scheduling with Dynamic Voltage/Speed Adjustment Using Slack Reclamation in Multiprocessor Real-Time Systems", IEEE Transactions on Parallel and Distributed Systems, vol. 14, N° 7, July 2003, and in a document D3 by N. Ventoux: "Contrôle en ligne des systèmes multiprocesseurs hétérogènes embarqués—elaboration et validation d'une architecture", doctoral thesis defended on 19 Sep. 2006 at University of Rennes 1. These techniques may be implemented off-line as well as on-line. In an off-line approach, the pairings (voltage, frequency) for the various processors may be adjusted globally by calculating a global slowing-down factor (according to the global time constraint or deadline of the application) or locally by calculating a slowing-down factor local to each task (according to their contribution to the critical path of the application). In an on-line approach, these techniques aim to detect the time excesses due to the variations of the actual execution times of the tasks and exploit them so as to reduce the energy consumed while guaranteeing that the time constraints are observed.

The difficulty clearly appears at the level of the preparation of an optimal consumption management method which remains compatible with a global scheduling. In practice, in a global scheduling context as presented in the abovementioned documents D2 and D3, the authors make do with sub-optimal excess distribution methods in order to observe the time constraints. In the document D2, a time excess obtained during the execution is shared between tasks assigned to different resources so as to enable the tasks to observe their time constraints. In this method, portions of the time excesses may be disregarded to observe an a priori set task execution order, by being based on the worst-case execution times WCET and a global scheduling policy which executes the longest task first, (Largest Task First) LFT. In the document D3, the method assigns the time excess obtained during the execution to the next task in the precedence chart. This method for distributing excesses according to the data or control dependencies is quite compatible with a global scheduling policy, but it does not make it possible, for example, to exploit all the excesses produced by the various branches of a convergence. In practice, only the smallest excess, out of the excesses produced by the various branches, is implemented to reduce the energy consumed.

SUMMARY OF THE INVENTION

One aim of the invention is notably to overcome the abovementioned drawbacks and make it possible to significantly reduce the energy consumed, including in a multiprocessor and global scheduling context.

To this end, the subject of the invention is a method for managing the energy consumption of a multiprocessor system executing at least one application according to chart of tasks (Ti), said method comprising at least, for each application:

a first phase for off-line characterization of the variation of the potential rate of parallelism of execution of the tasks as a function of time, this characterization being based on the worst-case behavior of the tasks;

a second phase for on-line detection and exploitation of the potential inactivity intervals, the time until which a processor concerned may remain inactive being obtained according to the worst-case potential rate of parallelism characterized off-line, an appropriate idle mode being calculated and activated according to the time until which the processor may remain active.

Advantageously, the on-line phase executes, for example, a detection and an exploitation of the time excesses produced by the tasks during actual execution relative to the execution times of the worst-case behavior, the time excess produced by a task being assigned to the task allocated immediately after on the same processor to reduce its execution speed, this reduction of the execution speed being obtained by switching the processor from a given (voltage, frequency) pairing to a lower pairing.

In another possible implementation, in the second phase, in addition to the detection of the inactivity intervals and the implementation of the idle modes (DPM), the time excesses are detected to dynamically adjust the voltages and the frequencies DVFS of the processors.

The off-line characterization phase comprises, for example, at least:

a task labeling phase in which successive tasks are grouped together under labels;

a global label scheduling phase;

a phase for storing the execution start times of the various labels and the number of processors necessary at each time, the storage being performed in a data structure, said structure characterizing the worst-case parallelism of the tasks. The time until which a processor may remain inactive corresponds, for example, to the time of arrival of the next label of the worst-case behavior, determined off-line, which increases the rate of parallelism.

The off-line characterization phase may include a phase for determining functional start modes for the processors necessary for the execution of the application, said functional modes being determined according to the arrival times of the first labels. The construction of a label satisfies, for example, the following rules:

at the level of a convergence in the chart, the construction of a label is stopped before the convergence task;

at the level of a divergence of the chart, the construction of a label is continued along a branch, and other labels are constructed for the other branches;

a task belongs only to a single label.

A label includes, for example, the maximum of tasks of one and the same branch of the chart.

In another possible implementation, the time excess produced by a task Ti executed on a given processor is assigned to the next task Ti+1 allocated to the same processor.

The time excesses obtained by different tasks are, for example, aggregated until a time long enough to activate a lower pairing (voltage, frequency) is obtained, a time excess being aggregated with another if it does not allow for a switch to a lower pairing (voltage, frequency) when considered on its own.

The time excesses may be aggregated throughout execution and assigned to the terminal tasks of the labels.

BRIEF DESCRIPTION OF THE DRAWINGS

Other features and advantages of the invention will become apparent from the following description, given in light of the appended drawings which represent.

DETAILED DESCRIPTION

Figure 1:
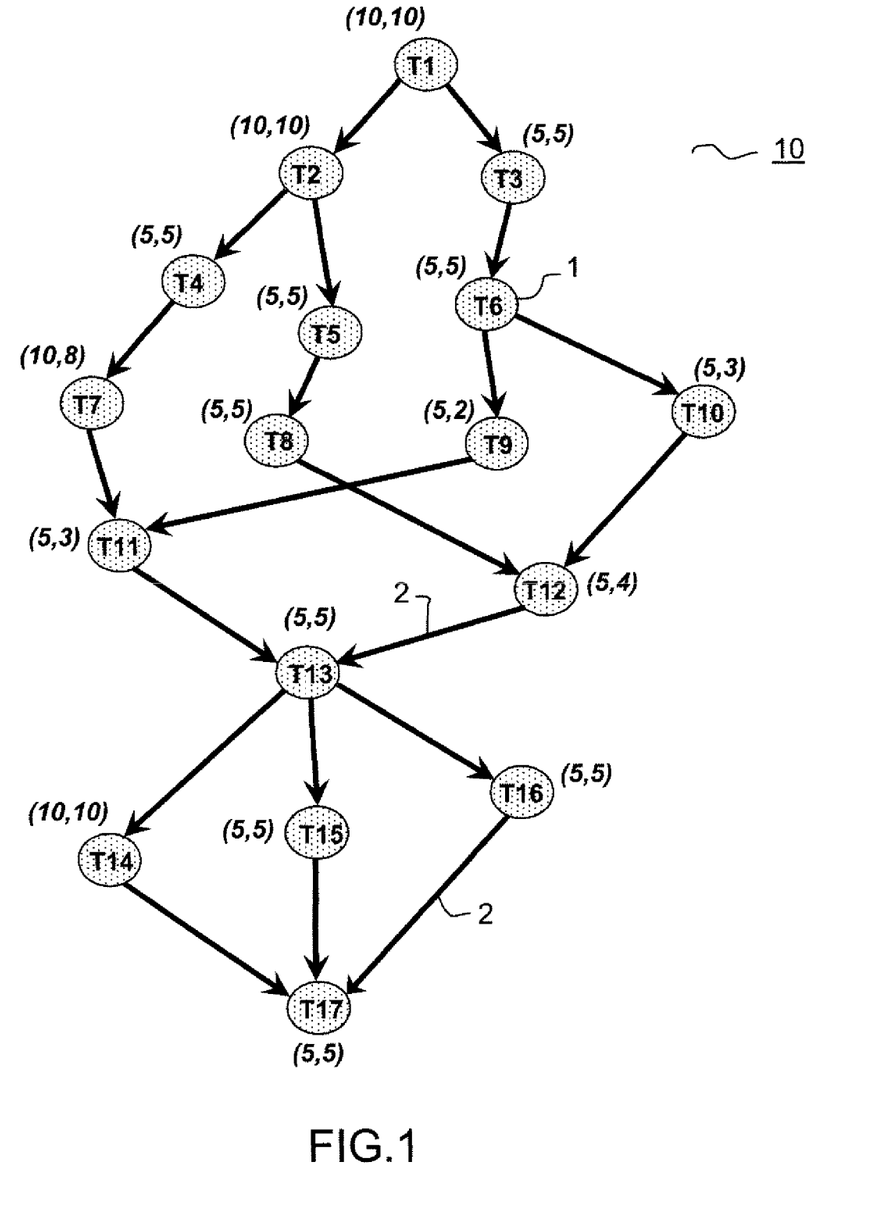
FIG. 1, an exemplary chart describing the association of tasks for the execution of an application.

FIG. 1 shows an exemplary chart 10 which describes the association of a set of tasks Ti and the precedence relationships that exist between them. In this type of modeling, the tasks are represented by nodes 1 and the data dependencies are represented by arcs 2. An arc 2 that links a task Ti to a task Tj means that the task Tj can begin its execution only after the end of the execution of the task Ti. As indicated previously, this subdivision into tasks aims to express a computation parallelism that can be located in an application and thus speed up the computation by assigning parallel tasks to a number of processors in order to satisfy the performance constraints. Such an architecture consumes a significant quantity of energy. In a real-time context, this type of architecture is generally dimensioned for the worst case according to the applications supported and the time constraints to be observed, notably by characterizing each task by a worst-case execution time. In the mode of representation of FIG. 1, a pair (WCET, AET) indicates for each task Ti the worst-case execution time WCET by its first component and the actual execution time AET by its second component.

Figure 2:
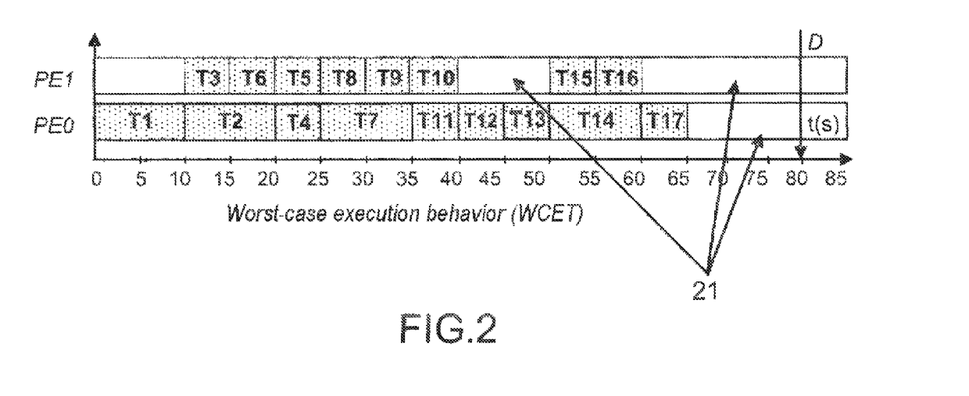
FIG. 2, an example of worst-case execution behavior of the chart model present in the preceding figure, in the case of execution by two processors.

FIG. 2 describes, by way of example, a worst-case execution behavior of the chart model presented in FIG. 1 according to the so-called EDF (earliest deadline first) scheduling policy for a two-processor architecture. The method according to the invention which will be presented hereinbelow may be applied to this policy and to other scheduling policies such as, notably, the so-called LLF (least laxity first) and ELLF (enhanced least laxity first) policies. FIG. 2 therefore presents the parallel execution of the tasks 1 of FIG. 1 by two processors. The tasks are executed in succession on the two processors PE0 and PE1 according to the dependencies explained by the chart 10 of FIG. 1. The start and the execution times of the tasks are represented as a function of time.

Inactivity intervals 21 due to the variation of the rate of parallelism may occur at certain synchronization points, for example at the times 40 and 60 for the second processor PE1 and at the time 65 for the first processor PE0. If these inactivity intervals occur during the actual execution in the same way, at the same times with the same lengths and on the same processors, idle modes may be calculated off-line and implemented during execution, on-line, to reduce the energy consumed. Unfortunately, as was indicated previously, the variation of the actual task execution times relative to their worst-case execution times WCET may vary the order and the activation times of the tasks. Thus, the off-line prediction of the arrival times and of the lengths of the inactivity intervals 21 becomes very difficult. This difficulty limits the exploitation of opportunities for reducing the energy consumed which may occur during the execution of the tasks.

Figure 3:
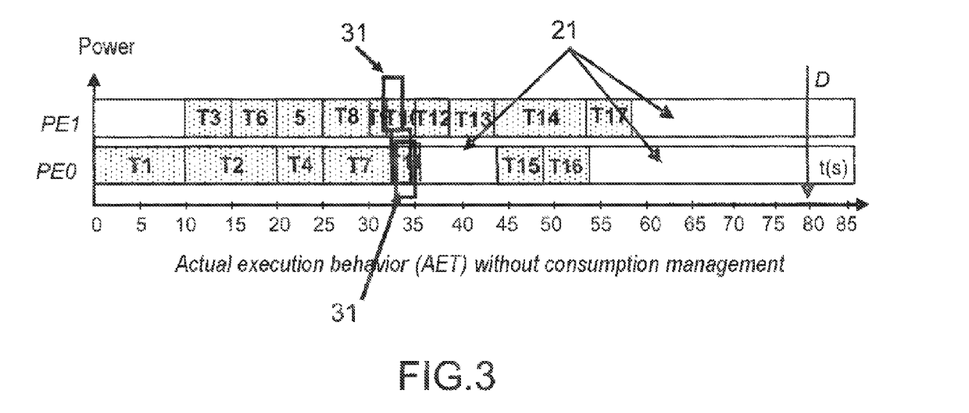
FIG. 3, an example of the actual task execution behavior by the two processors.

FIG. 3 illustrates the actual task execution behavior by the two processors PE0 and PE1. This FIG. 3 also shows the difference that there may be between the worst-case behavior illustrated by FIG. 2 and the actual behavior. The variation of the task execution times relative to the worst-case execution times reveals time excesses 31. These time excesses may be exploited to slow down the execution speeds of the subsequent tasks and therefore reduce consumption, while observing the real-time constraints. For example, the task T9 commencing at the time 30 has consumed only two time units of its execution time set for the worst case to 5 time units, this task T9 being executed in the worst case between the times 30 and 35. In this context, the time excess 31, equal to 3 units, recovered from the task T9, may be assigned to one of the subsequent tasks to slow down its execution speed. The slowing down of the execution speed of a task is reflected notably in the switching of the processor processing this task from one frequency-voltage pairing to a new, lower pairing, lower operating frequency and lower voltage, making it possible to reduce the energy consumed. In practice, the power consumed by a processor depends quadratically on the power supply voltage which may be reduced by reducing the operating speed. The following relations describe this dependency of the power consumed $P_{dynamic}$:

$$P_{dynamic} = \alpha \cdot C_L \cdot V_{dd}^2 \cdot f_{clk} \quad (1)$$

$$f_{clk} = K \frac{(V_{dd} - V_{th})^2}{V_{dd}} \quad (2)$$

in which:

$\alpha$ represents the activity factor, corresponding to the average number of transitions from the high state to the low state for each clock cycle;

$C_L$ represents the capacitance charged during a transition;

$V_{dd}$ represents the power supply voltage;

$f_{clk}$ represents the clock frequency of the circuit;

$V_{th}$ represents the threshold voltage;

K is a constant which depends on the characteristics of the circuit.

In a global scheduling context, it is difficult to use the distribution of the time excesses obtained during execution to effectively reduce the energy without violating the time constraints.

Figure 4:
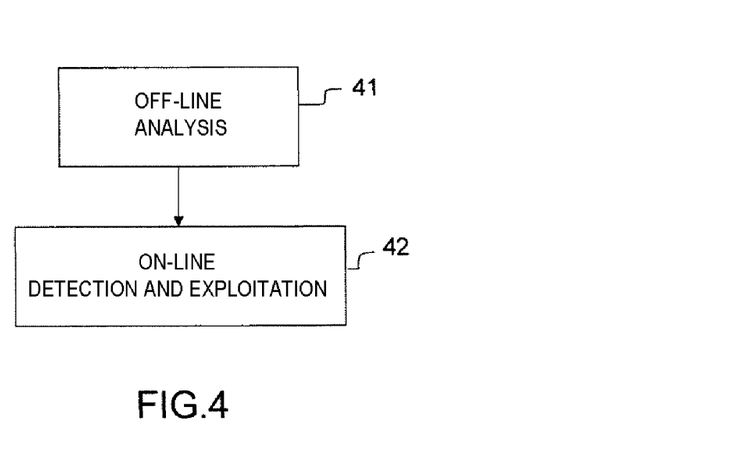
FIG. 4, a presentation of the two possible phases for implementation of the method according to the invention.

FIG. 4 illustrates the two possible phases for the implementation of the method according to the invention. In particular, the method comprises an off-line characterization phase 41 and a subsequent on-line detection and exploitation phase 42. In the off-line phase 41, the method characterizes the trend over time of the potential rate of parallelism of a given application. The rate of parallelism corresponds, at a given instant, to the number of tasks active on the number of processors available in the architecture. The information obtained from the off-line characterization is used subsequently in the on-line phase 42 to determine the durations of the inactivity intervals that will occur during execution. Thus, according to these durations and the characteristics of the target processors, idle modes may be determined and activated. In addition to the on-line implementation of the idle modes, the method detects, in this phase, all the time excesses produced by the tasks and dynamically adjusts the voltages and frequencies of the processors to further reduce the consumption.

Figure 5:
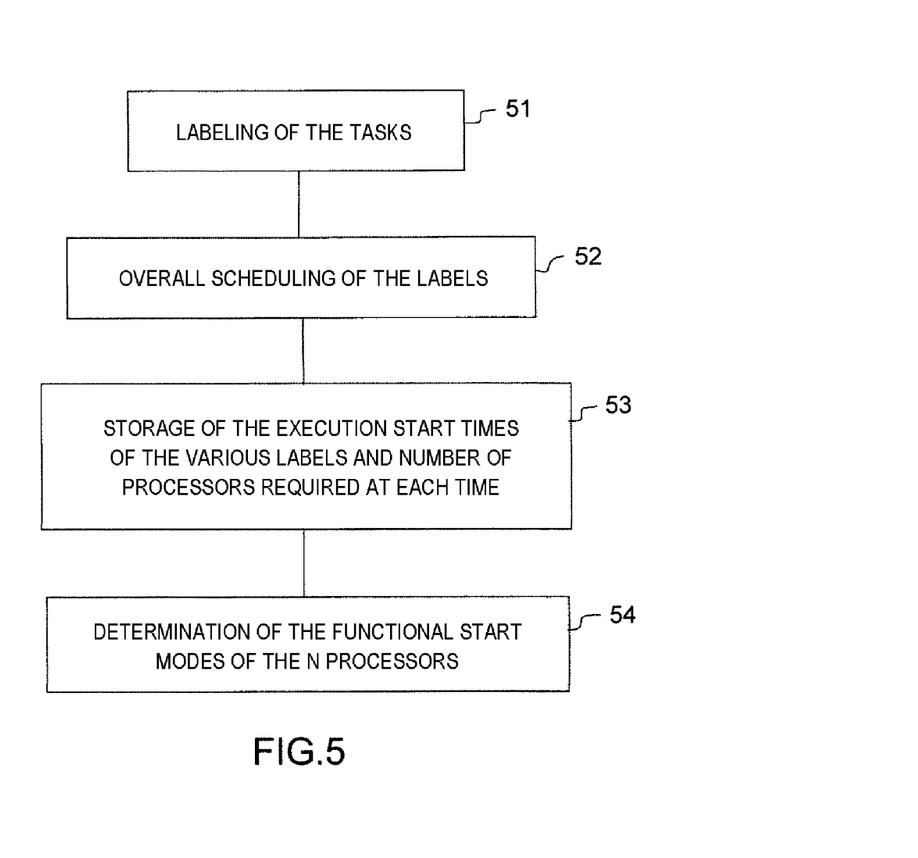
FIG. 5, a presentation of the possible sub-phases that make up the first phase, the phase for off-line characterization of the rate of parallelism, of the method.

FIG. 5 presents an exemplary embodiment of the off-line characterization phase 41 according to the following successive sub-phases:

- a task labeling phase 51;
- a task scheduling phase 52;
- a phase 53 for storing execution start times of the different labels and the numbers of processors necessary at each time, the storage being performed in a data structure characterizing the parallelism of the tasks;
- a phase 54 for determining functional start modes for the N processors necessary for the execution of the application.

Figure 6:
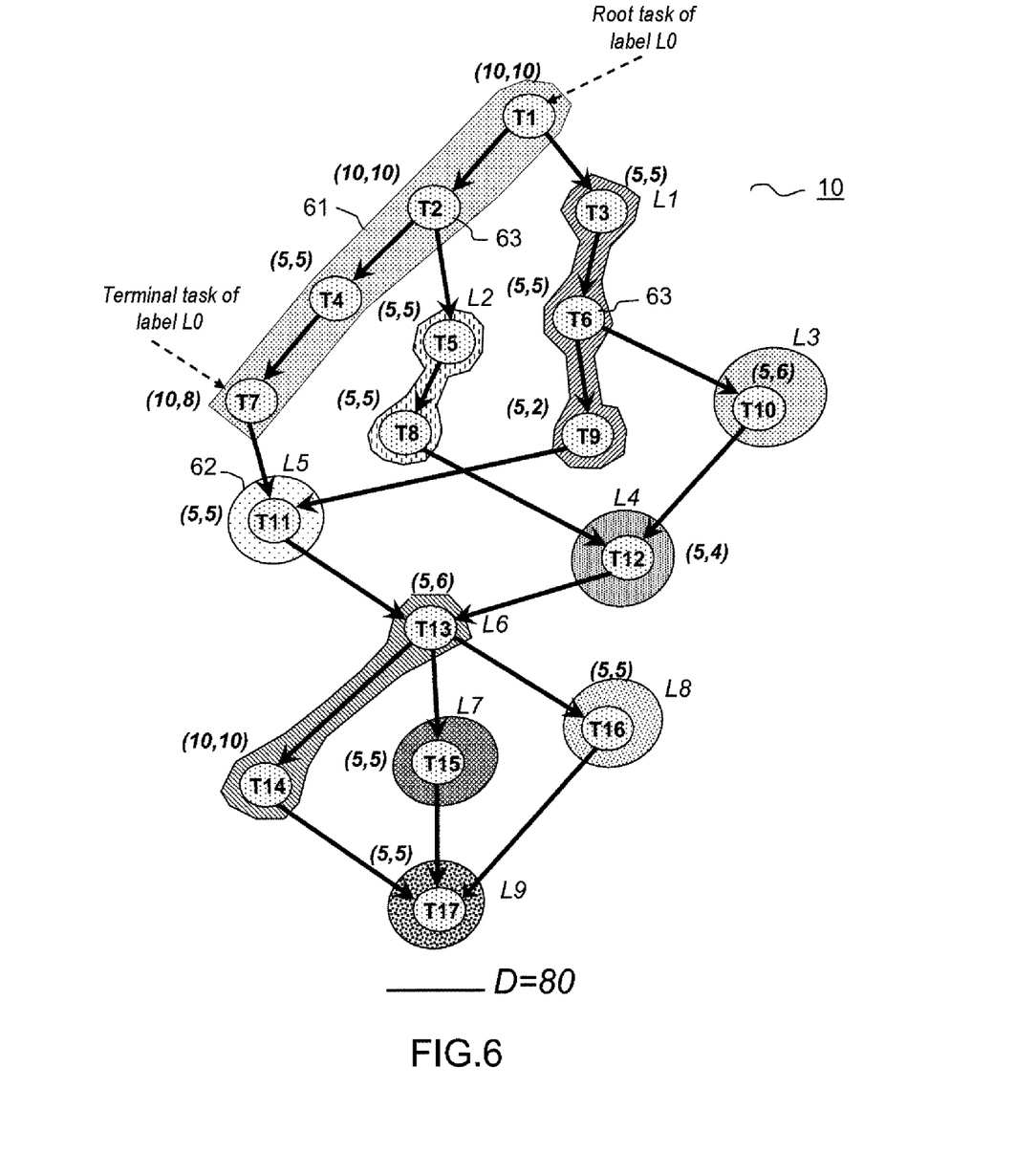
FIG. 6, an example of labeling of the chart of FIG. 1.

FIG. 6 illustrates the labeling phase 51; in this phase, the method according to the invention breaks down the chart of tasks 1 of the application into labels 61. A label Ln thus combines one or more interdependent tasks Ti that are likely to be executed sequentially. FIG. 6 illustrates such a labeling. Nine labels L1, . . . L9 combine the 17 tasks T1, . . . T17. The construction principle for the labels Ln corresponds notably to the following rules:
  a label combines a maximum of tasks;
  at the level of a convergence 62, the construction of a label is stopped before the convergence task;
  at the level of a divergence 63, the construction of a label is continued along a branch, L0 for example, and other labels are constructed for the other branches, L1 or L2 for example;
  a task belongs only to a single label.

A label is thus a combination of tasks, which can be restricted to just one, making it possible to identify an increase by 1 in the rate of parallelism. This increase may require an additional processor to process the tasks of this label. The labeling 51 thus makes it possible in a similar manner to identify a reduction by 1 in the rate of parallelism at the end of execution of an end task of this label.

Once the chart of the application has been broken down into labels, a global scheduling 52 of the chart is performed off-line. This scheduling may, for example, be based on static or dynamic priorities as defined by the EDF-LTF (earliest deadline first—largest task first) policy or in the ELLF (enhanced least laxity first) policy. The preceding FIG. 2 describes such an off-line scheduling of the chart by being based on the worst-case execution times WCET and the EDF-LTF policy. Once the worst-case execution behavior has been obtained in this way, the execution start times of the different labels Ln, and the number of processors necessary at each time, are stored 53 in a data structure.

Figure 7:
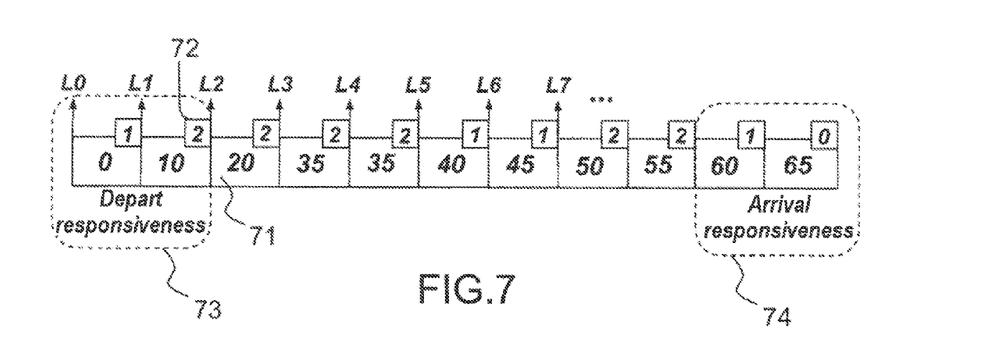
FIG. 7, a presentation of a data structure characterizing the rate of parallelism.

FIG. 7 illustrates this data structure characterizing the potential worst-case parallelism. The start times 71, for example the times 0, 10, 20, 35, 40, 45, 50, 55, 60, 65 and the number 72 of processors necessary at each of these times are stored in successive memory places. For example, at the time 0 there is only the task T1, start task also called root task of the label L1, starting its execution. Thus, one single processor is necessary to process this task. The number 1 is therefore indicated as the number 72 of processors necessary for the execution of the tasks. At the time 35 for example, the two labels L3 and L5 begin their execution simultaneously and require two processors, hence the number 2 indicated. The two arrival times are stored separately in the data structure.

After the potential parallelism has been characterized in this way, the method determines 54 functional start modes for the N processors necessary for the execution of the application. All of these functional modes will hereinafter be called start responsiveness. This responsiveness is determined according to the arrival of the first N labels increasing the potential parallelism. In the preceding example, illustrated notably by FIGS. 6 and 7, these are the two labels, L0 and L1, that set the start responsiveness 73. In practice, a single active processor is required from the time 0, time of appearance of the label 0, until the time 10, time of appearance of the label L1, to execute the first task T1 of the label L0.

Thus, with such information relating to the variation of the potential rate of parallelism, it is possible to set a start responsiveness such that:
  the first processor PE0 is active;
  the second processor PE1 is in the inactive state (idle mode), of "standby" type if the time of arrival of the label L1 is greater than the time needed to switch from the "standby" state to the active state.

The time of switching from one mode to the other is a characteristic of the resource. It may be taken from the power state machine (PSM) of the resource, supplied by the manufacturer. This state machine describes the various idle (nonfunctional) modes supported by the resource, the power consumed relative to each mode and the possible transitions with their time and energy costs. Once the information relating to potential parallelism and start responsiveness have been determined, the on-line management of consumption may be performed in the next phase 42.

During the next phase 42, the method according to the invention detects, on-line, all the inactivity intervals that occur during execution, these intervals being due to a lowering of the rate of parallelism. This lowering is reflected at a given instant in a number of active tasks that is lower than the number of active processors in the architecture. Once an inactivity interval has been detected, the method determines and activates the appropriate DPM mode.

In reality, a processor is characterized by a given number of operating points defined by pairings (voltage, frequency) and idle modes, such as "standby" or "sleep" for example. The switching of a resource from one operating point to another introduces a time latency and requires a not inconsiderable additional energy. In order to guarantee the observance of the time constraints and the cost-effectiveness of a switch from one operating point to another, the method according to the invention takes into account these time and energy cost premiums in each decision to put a resource to sleep.

By monitoring on-line the actual variation of the rate of parallelism of an application, the invention detects any inactivity interval due to a lowering of the number of labels active at the same time. Depending on this variation of the rate of parallelism, one or more processors may be set to idle mode until a potential increase in the rate of parallelism. It should be noted that, during execution, an inactivity interval may occur earlier than its date of appearance predicted in the worst-case model. This phenomenon is notably due to the variation of the actual execution times AET relative to the estimated worst-case execution times WCET. Once the inactivity interval has been detected, the invention determines, on-line, by virtue of the data structure 71, 72 constructed off-line, the time until which the processor may remain inactive. This time corresponds to the time of arrival in the worst case of the next label which increases the rate of parallelism.

In addition to management of the idle modes, the method according to the invention makes it possible to dynamically adjust, during execution, the voltages and the operating frequencies of the various processors. This management is performed by exploiting the time excesses "slack times" obtained during execution. These excesses are due to the variations of the actual execution times AET of the tasks relative to the worst-case execution times WCET. According to the invention, these time excesses are assigned to the subsequent tasks relative to the resource dependencies in order to reduce the energy consumed without violating the time constraints. The method according to the invention detects, on-line, all the time excesses due to the variations of the actual execution times of the tasks relative to the worst-case execution times. Once a time excess has been detected, the appropriate pairing (voltage, frequency) is determined and activated. In order to have the actual execution behavior of the application converge with the worst-case execution behavior and best exploit the data characterizing the potential parallelism, the time excesses are distributed according to the resource dependencies. Thus, the time excess produced by a task Ti which is executed on the processor Pj is assigned to the subsequent task Ti+1 assigned to the latter resource.

The present invention therefore comprises two on-line consumption management techniques, a DVFS-type technique and a second technique of DPM type which can be applied separately or simultaneously. It should be noted here that the implementation of the DVFS technique without management of the idle modes (DPM) does not require the off-line analysis phase 41. In practice, the detection and the exploitation of the time excesses are performed on-line.

Figure 8:
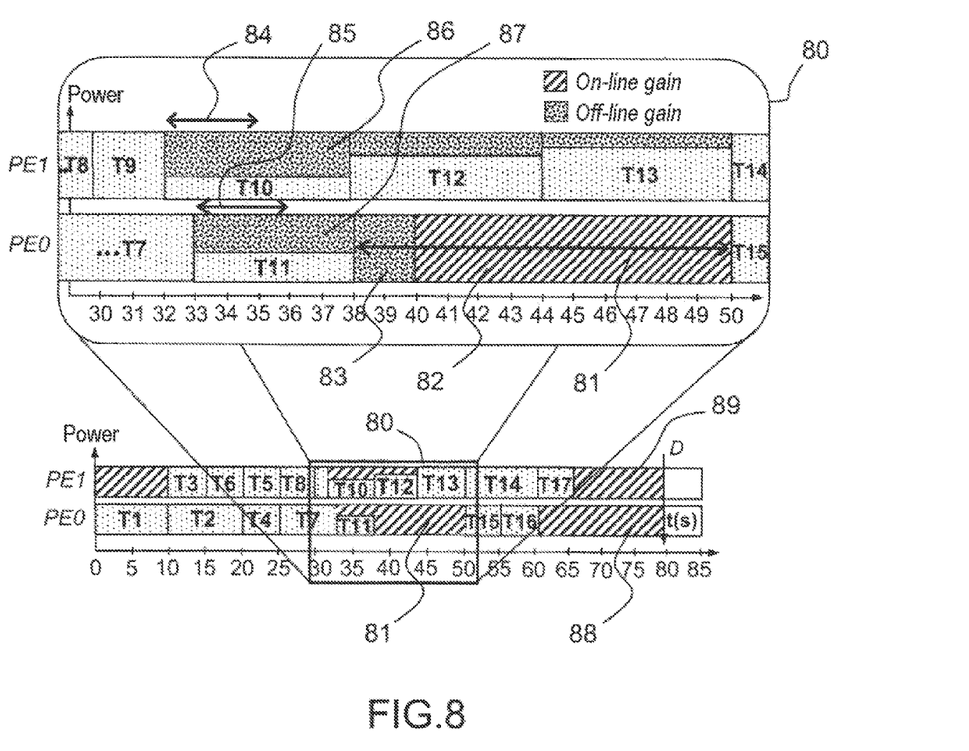
FIG. 8, an illustration of an example of distribution of the time excesses, on-line, during execution of the application.

FIG. 8 illustrates an exemplary implementation of the DPM and DVFS techniques according to the invention, applied to the case illustrated by the preceding figures. An inactivity interval 81 occurs on the processor PE0 after the time 35. More specifically, by enlarging the region 80 surrounding the inactivity interval, it appears that the latter occurs at the time 38 instead of the time 40, calculated in the worst case as illustrated by FIG. 2. The region 80 shows the inactivity interval 82 calculated off-line in the worst case and the additional interval 83 obtained on-line, the latter constituting a time excess. The offset of two time units is due to the time excess generated by the end task T11 of the label L5 represented in FIG. 6. This time excess cannot be exploited by a DVFS technique, notably given that there are no more tasks to be assigned to the resource concerned, the processor PE0. According to the invention, this excess is taken into account in the inactivity interval calculated on-line. The latter is often longer than the inactivity interval 82 predicted off-line. Thus, with this on-line gain, a more significant idle mode than that determined off-line may be implemented. To determine the appropriate idle mode, it is possible, for example, to use the so-called LEA (lower envelope algorithm) algorithm, notably described in a document D4 by S. Irani: "Online Strategies for Dynamic Power Management in Systems with Multiple Power-Saving States", ACM Transactions on Embedded Computing Systems, Vol. 2, N° 3, August 2003, pages 325-346. In practice, this algorithm can be extended to take into account the time and energy cost premiums relating to the putting to sleep and reawakening of resources in order to ensure that the time constraints are observed.

FIG. 8 also illustrates an exemplary distribution of the time excesses obtained during execution. For example, the time excess 84 produced by the task T9 is consumed by the task T10, given than the latter is executed directly after the task T9, on the same processor PE1. In the worst-case execution behavior, the end of the task T9 was estimated at the time 35 whereas its actual execution ends at the time 32. There is therefore a time excess of three time units. Similarly, the time excess 85 produced by the task T7, equal to two time units, is assigned to the next task T11, on the same processor PE0. It also appears clearly that, at the level of this task T11, which is a convergence task as shown by FIG. 7, no time excess is lost.

An excess obtained 84, 85 is used to switch the processor processing the task producing this excess from one pairing (frequency, voltage) to a new, lower power pairing, thus making it possible to reduce the energy consumed, according to a suitable DVFS mode. FIG. 8 clearly shows the power gains 86, 87 and 83 obtained on-line that are added to the gain in the inactivity interval 82 estimated off-line.

In reality, it may be that the task that has just been executed produces a time excess that is insufficient for the next task on the same processor to activate a DVFS mode. In this context, the excesses are aggregated until an excess that is long enough to activate a DVFS mode is obtained. This solution may also be implemented for optimization reasons. In practice, a number of time excesses may be aggregated on a resource in order to subsequently activate a DVFS mode that is more advantageous than the modes likely to be activated by the excesses considered separately. In this case, the time excesses are aggregated throughout the execution of the parallel branches, designated by labels. The time excesses aggregated on the various processors are exploited before the convergences by assigning them to the terminal tasks, a terminal task being an end-of-label task.

An on-line consumption management may advantageously be implemented by combining both DPM and DVFS techniques. By this combination, the invention makes it possible to exploit all the time excesses without exception, including the excesses produced by different branches of a convergence. It reproduces the worst-case execution behavior while assigning the excess produced by a task to the next task allocated to the same resource. This method for distributing excesses reveals, during execution, each inactivity interval at the time predicted off-line. In addition to this interval, the invention detects any time excess likely to prolong this inactivity interval. This excess is generated by the end-of-label task executed just before the occurrence of this inactivity interval due to a lowering of the number of labels active at the same time. As indicated previously, the time excesses that occur just before inactivity intervals cannot be exploited by a DVFS-type technique. This limit is lifted by the invention by using the DPM technique. Thus, once the inactivity interval has been detected, the appropriate idle mode is determined and activated on-line.

The on-line consumption management performed according to the invention is applicable in aperiodic and periodic application contexts. It is sufficient to define the arrival functional modes, called arrival responsiveness, of the various processors at the end of the application. Based on this arrival responsiveness, there is determined, on-line at the end of execution of each terminal task of the last N labels, the appropriate idle mode to which the resource may be set. For example, the end of the last two labels L8 and L9 with the respective tasks T16 and T17 of FIGS. 6 and 8 marks the freeing of two processors. FIG. 8 shows that, at the time 60, the label L8 finishes its execution with the end of the task T16 and frees the processor PE0. Similarly, at the time 65, it is the last label of the application L9 that finishes its execution with the end of the task T17. Thus, at the end of execution of each of these labels, an idle mode can be determined according to the detected inactivity intervals 88, 89.

For a periodic application, the management of the DPM modes of the various iterations of the application remains valid by using the same data structure describing the arrival times of the labels and the potential parallelism corresponding to the first iteration. It is enough to update the arrival times of the labels for each iteration. The arrival time of a label i of the iteration of order j+1 is equal to its time of arrival at the iteration j plus the period T of the application. In this case, idle modes corresponding to the arrival responsiveness are calculated on-line at the end of each iteration. These modes are calculated as a function of the arrival times of the first N labels of the next iteration.

In a multi-application and multi-instance context of one and the same application, the potential parallelism is characterized in the worst case for each application. In order to guarantee the time constraints, the architecture must be dimensioned according to the number of applications and the number of instances of each of them that it must support. In this case, the resources are increased according to the number of applications and/or instances. For example, if a system aims to execute in parallel a given application that requires two processors and two instances of another application requiring three processors, the architecture must incorporate eight processors. In this case, one of the two scheduling versions with consumption management may be implemented.

A first version based on the total sharing of the resources with a global scheduling of the tasks coming from the various applications and/or instances may be used. With this version, the distribution of the excesses according to the resource dependencies remains valid. Thus, a time excess produced by a task coming from a given application may be assigned to a task coming from another application as long as these two tasks are assigned to the same resource. As for the management of the DPM modes, an operation involving the on-line merging of the different data structures, corresponding to the modelings of the potential rate of parallelism of the various applications and their instances, is put in place. This merging notably consists in updating the arrival times of the labels of each application and/or instance and merging them in ascending order. The resultant structure is exploited in the same way as that in a single-application context.

A second version is based on the reservation of the resources for each application and/or instance with a global scheduling at the task level and by partitioning at the application level. More specifically, the execution of the tasks of each application/instance is performed by being based on a global scheduling and an allocation limited to the resources reserved for the latter. In this case, the distribution of the time excesses is managed in the same way relative to the resource dependencies. With the distribution of resources by application, the time excesses obtained by tasks of a given application are exploited by other tasks of the same application. Thus, no time excess is shared between two different applications. The DPM modes are managed separately by being based on the data characterizing the potential parallelism obtained from the different applications, but each considered separately.

The invention claimed is:

1. A method for managing energy consumption of a multiprocessor system comprising two or more processors, the multiprocessor system executing at least one application, said method comprising, for each application:
  a first phase for off-line characterization of a variation of a potential rate of parallelism of execution of the tasks by the two or more processors as a function of time, the off-line characterization being based on a global dynamic task scheduling with worst-case execution times of the tasks, the first phase comprising:
    receiving a chart of tasks for each of the at least one application;
    a task labeling phase that associates subsets of the tasks into labels, and
    a storing phase that stores execution start times of the labels and a number of processors necessary in the multiprocessor system at each start time; and
  a second phase for on-line detection and exploitation of potential inactivity intervals, the second phase comprising:
    an idle mode that predicts a duration of the potential inactivity intervals, between two consecutive labels that reduce a rate of parallelism, during which a processor of the multiprocessor system is inactive, and
    a processor energy consumption scaling technique that assigns a slack time to the next task allocated on the processor to reduce the execution speed of the processor during the next task by lowering the voltage and/or frequency of the processor,
  wherein the second phase executes a detection and an exploitation of time excesses produced by the tasks during actual execution relative to the execution times of the worst-case execution times.

2. The method as claimed in claim 1, wherein the second phase detects the time excesses to dynamically adjust the voltage and/or frequency of the processor.

3. The method as claimed in claim 1, wherein successive tasks are grouped together under various labels in the task labeling phase, and the first phase further comprises:
  a global label scheduling phase, wherein
    the storing of the execution start times of the various labels and the number of processors necessary at each start time being performed in a data structure, said data structure characterizing the worst-case parallelism of the tasks.

4. The method as claimed in claim 3, wherein the duration of the potential inactivity intervals comprises a time of arrival of a next label of the worst-case execution times, determined off-line, which increases the potential rate of parallelism.

5. The method as claimed in claim 3, wherein the first phase includes a phase for determining functional start modes for processors necessary for the execution of each application, said functional start modes being determined according to arrival times of first labels.

6. The method as claimed in claim 3, wherein construction of a label satisfies the following rules:
  at a level of a convergence in the chart, the construction of a label is stopped before a convergence task;
  at a level of a divergence of the chart, the construction of a label is continued along a branch, and other labels are constructed for other branches; and
  a task belongs only to a single label.

7. The method as claimed in claim 6, wherein a label includes a maximum number of tasks of the same branch of the chart.

8. The method as claimed in claim 1, wherein the slack times obtained in different tasks are aggregated until a predetermined time that activates a lower voltage and a lower frequency is reached, a slack time being aggregated if the slack time alone is less than the predetermined time.

9. The method as claimed in claim 8, wherein the slack times are aggregated throughout execution and assigned to terminal tasks of the labels.

10. The method as claimed in claim 1, wherein execution of one or more of the tasks migrates from one processor to another processor in the multiprocessor system.

* * * * *